(12) United States Patent
Brown et al.

(10) Patent No.: US 10,969,283 B2
(45) Date of Patent: Apr. 6, 2021

(54) SENSING TEXTILE

(71) Applicants: SAINT-GOBAIN ADFORS CANADA, LTD., Grand Island, NY (US); University of Massachusetts, Boston, MA (US)

(72) Inventors: Nancy E. Brown, New Braintree, MA (US); Sahas Rathi, Westborough, MA (US); Tzuyang Yu, Lowell, MA (US); Xingwei Wang, Lowell, MA (US); Pradeep Kurup, Lowell, MA (US); Jackson A. Ivey, Worcester, MA (US)

(73) Assignees: SAINT-GOBAIN ADFORS CANADA, LTD., Grand Island, NY (US); UNIVERSITY OF MASSACHUSETTS, Boston, MA (US)

( * ) Notice: Subject to any disclaimer, the term of this patent is extended or adjusted under 35 U.S.C. 154(b) by 0 days.

(21) Appl. No.: 16/008,805

(22) Filed: Jun. 14, 2018

(65) Prior Publication Data
US 2018/0364115 A1 Dec. 20, 2018

Related U.S. Application Data

(60) Provisional application No. 62/521,099, filed on Jun. 16, 2017.

(51) Int. Cl.
*G01L 1/24* (2006.01)
*G02B 6/36* (2006.01)
(Continued)

(52) U.S. Cl.
CPC .............. *G01L 1/242* (2013.01); *B32B 23/10* (2013.01); *B32B 27/12* (2013.01); *G01L 1/246* (2013.01);
(Continued)

(58) Field of Classification Search
CPC ......... G01L 1/242; B32B 23/10; B32B 27/12; G01N 21/81; G02B 6/022; G02B 6/06;
(Continued)

(56) References Cited

U.S. PATENT DOCUMENTS

| 5,256,468 A | 10/1993 | Wiener |
| 5,469,895 A | 11/1995 | Wiener |

(Continued)

FOREIGN PATENT DOCUMENTS

| CA | 2537214 C | 6/2012 |
| CN | 1303009 A | 7/2001 |

(Continued)

OTHER PUBLICATIONS

International Search Report and Written Opinion for PCT/US2018/037573, dated Oct. 24, 2018, 12 pages.

(Continued)

*Primary Examiner* — Jerry M Blevins
(74) *Attorney, Agent, or Firm* — Abel Schillinger, LLP; Adrian Lawrence (57) ABSTRACT

A sensing textile includes at least one assembly of optical fiber filaments, wherein the sensing textile has a main direction and a cross direction, and wherein the at least one assembly of optical fiber filaments is oriented at any angle measured relative to the cross direction.

20 Claims, 1 Drawing Sheet

(51) Int. Cl.
*G01N 21/81* (2006.01)
*G02B 6/02* (2006.01)
*B32B 23/10* (2006.01)
*G02B 6/06* (2006.01)
*B32B 27/12* (2006.01)

(52) U.S. Cl.
CPC .............. *G01N 21/81* (2013.01); *G02B 6/022* (2013.01); *G02B 6/06* (2013.01); *G02B 6/3672* (2013.01); *D10B 2101/06* (2013.01); *D10B 2101/12* (2013.01); *D10B 2331/04* (2013.01); *D10B 2401/20* (2013.01); *D10B 2403/0243* (2013.01)

(58) Field of Classification Search
CPC .............. G02B 6/3672; D10B 2101/06; D10B 2101/12; D10B 2331/04; D10B 2401/20; D10B 2403/0243
USPC .......................................................... 385/12
See application file for complete search history.

(56) References Cited

U.S. PATENT DOCUMENTS

| | | | |
|---|---|---|---|
| 5,567,932 | A | 10/1996 | Staller et al. |
| 6,012,337 | A | 1/2000 | Hodge |
| 6,080,690 | A | 6/2000 | Lebby et al. |
| 6,274,863 | B1 | 8/2001 | Kersey |
| 6,522,797 | B1 | 2/2003 | Siems et al. |
| 7,054,011 | B2 | 5/2006 | Zhu et al. |
| 7,532,780 | B2 | 5/2009 | Delmas et al. |
| 7,630,591 | B2 | 12/2009 | Allen et al. |
| 8,174,703 | B2 | 5/2012 | Wang et al. |
| 8,316,694 | B2 | 11/2012 | Artieres et al. |
| 9,373,234 | B1* | 6/2016 | Beinhocker .......... G08B 13/126 |
| 2001/0032924 | A1 | 10/2001 | Pramila et al. |
| 2002/0020224 | A1 | 2/2002 | Sato et al. |
| 2002/0088931 | A1 | 7/2002 | Danisch et al. |
| 2003/0044155 | A1 | 3/2003 | Maiden |
| 2006/0083458 | A1 | 4/2006 | Iffergan |
| 2006/0140532 | A1 | 6/2006 | Menendez Martin et al. |
| 2007/0037462 | A1 | 2/2007 | Allen et al. |
| 2007/0279632 | A1 | 12/2007 | Delmas et al. |
| 2008/0019701 | A1 | 1/2008 | Tam et al. |
| 2008/0047662 | A1 | 2/2008 | Dria et al. |
| 2008/0234898 | A1 | 9/2008 | Wiener |
| 2008/0254712 | A1 | 10/2008 | Allen et al. |
| 2009/0303460 | A1 | 12/2009 | Habel et al. |
| 2010/0175460 | A1 | 7/2010 | Artieres et al. |
| 2010/0180691 | A1 | 7/2010 | Hatami et al. |
| 2011/0058767 | A1 | 3/2011 | Ishibashi et al. |
| 2012/0300807 | A1 | 11/2012 | Freitag et al. |
| 2013/0024145 | A1* | 1/2013 | Hull Roskos .......... G01R 21/02 702/65 |
| 2013/0280477 | A1 | 10/2013 | Davis et al. |
| 2014/0206988 | A1* | 7/2014 | Ramachandran ........ G01K 3/14 600/424 |
| 2015/0114130 | A1* | 4/2015 | White .................. G01L 11/025 73/800 |
| 2016/0345872 | A1* | 12/2016 | Wasson ................ A61B 5/1459 |

FOREIGN PATENT DOCUMENTS

| | | |
|---|---|---|
| CN | 201293649 Y | 8/2009 |
| CN | 201301407 Y | 9/2009 |
| CN | 101597869 A | 12/2009 |
| CN | 101736620 A | 6/2010 |
| CN | 101793502 A | 8/2010 |
| CN | 101900533 A | 12/2010 |
| CN | 201660871 U | 12/2010 |
| CN | 102345472 A | 2/2012 |
| CN | 102995619 A | 3/2013 |
| CN | 102324275 B | 6/2013 |
| CN | 103292719 A | 9/2013 |
| CN | 204354493 U | 5/2015 |
| CN | 204596050 U | 8/2015 |
| CN | 204703060 U | 10/2015 |
| CN | 105064187 A | 11/2015 |
| CN | 105332338 B | 9/2016 |
| CN | 104494167 B | 10/2016 |
| CN | 106404065 A | 2/2017 |
| DE | 102007032351 A1 | 1/2009 |
| EP | 1936058 A1 | 6/2008 |
| EP | 2177890 A1 | 4/2010 |
| EP | 2267204 B1 | 12/2013 |
| FR | 2728677 A1 | 6/1996 |
| JP | H1090018 A | 4/1998 |
| JP | H10267707 A | 10/1998 |
| JP | H11326149 A | 11/1999 |
| JP | 2001249035 A | 9/2001 |
| JP | 2001264028 A | 9/2001 |
| JP | 2001304822 A | 10/2001 |
| JP | 2002070015 A | 3/2002 |
| JP | 2002317451 A | 10/2002 |
| JP | 2002328010 A | 11/2002 |
| JP | 2004045135 A | 2/2004 |
| JP | 2005077113 A | 3/2005 |
| JP | 2005337831 A | 12/2005 |
| JP | 2006258613 A | 9/2006 |
| JP | 2012102465 A | 5/2012 |
| KR | 20090132273 A | 12/2009 |
| KR | 100978383 B1 | 8/2010 |
| KR | 20110092882 A | 8/2011 |
| KR | 101108968 B1 | 1/2012 |
| KR | 20130017561 A | 2/2013 |
| KR | 20130081762 A | 7/2013 |
| WO | 2015015060 A1 | 2/2015 |
| WO | 2016071700 A1 | 5/2016 |
| WO | 2016092167 A1 | 6/2016 |
| WO | 2018232136 A1 | 12/2018 |

OTHER PUBLICATIONS

Barrias et al., "A Review of Distributed Optical Fiber Sensors for Civil Engineering Applications," Sensors, 2016, 35 pgs, vol. 16, No. 748, MPDI.

Barbosa, Cristina, "Optical Fiber Sensors for Infrastructure Monitoring," Techbriefs.com, 2016, 2 pgs.

Krebber, Katerina, "Smart Technical Textiles Based on Fiber Optic Sensors," Current Developments in Optical Fiber Technology, 2013, pp. 319-344, Intech.

Giallorenzi et al., "Optical Fiber Sensor Technology," IEEE Transactions on Microwave Theory and Techniques, Apr. 4, 1982, pp. 472-511, vol. MTT-30, No. 4.

Jung et al., "Simultaneous measurement of strain and temperature by use of a single-fiber Bragg grating and an erbium-doped fiber amplifier," Applied Optics, 1999, pp. 2749-2751, vol. 38, No. 13, Optical Society of America.

López-Higuera et al., "Fiber Optic Sensors in Structural Health Monitoring," Journal of Lightwave Technology, 2011, pp. 587-608, vol. 29, No. 4, IEEE.

Liehr et al., "Distributed strain measurement with polymer optical fibers integrated into multifunctional geotextiles," Proceedings of SPIE, 2008, pp. 700302-1-700302-15, vol. 7003.

American Society of Civil Engineers, "Failure to Act: Closing the Infrastructure Investment Gap for America's Economic Future," 2016, 32 pgs.

Zou et al., "Ultrafast Fabry-Perot fiber-optic pressure sensors for multimedia blast event measurements," Applied optics, 2013, pp. 1248-1245, vol. 52, No. 6.

Tian et al., "A Study on Packaging of Miniature Fiber Optic Sensors for In-Vivo Blood Pressure Measurements in a Swine Model," IEEE Sensors Journal, 2013, pp. 1-7.

Wu et al., "An ultra-fast fiber optic pressure sensor for blast event measurements," Measurement Science and Technology, 2012, 7 pgs, vol. 23, IOP Publishing.

Wu et al., "Low-cost rapid miniature optical pressure sensors for blast wave measurements," Optics Express, 2011, vol. 19, No. 11, Optical Society of America.

(56) References Cited

OTHER PUBLICATIONS

Krebber et al., "Smart Technical Textiles based on fibre optic sensors," 22nd International Conference on Optical Fiber Sensors, 2012.
James et al., "Simultaneous independent temperature and strain measurement using in-fibre Bragg grating sensors," Electronics Letters, 1996, pp. 1133-1134, vol. 32, No. 12, Institution of Engineering and Technology.
Shu et al., "Dependence of temperature and strain coefficients on fiber grating type and its application to simultaneous temperature and strain measurement," Optics Letters, 2002, pp. 701-703, vol. 27, No. 9, Optical Society of America.
Li et al., "Recent applications of fiber optic sensors to health monitoring in civil engineering," Engineering Structures, 2004, pp. 1647-1657 vol. 26, No. 11, Elsevier.
Majumder et al., "Fibre Bragg gratings in structural health monitoring—Present status and applications," Sensors and Actuators A: Physical, 2008, pp. 150-164, vol. 1477, No. 1, Elsevier.
Wang et al., "Test on application of distributed fiber optic sensing technique into soil slope monitoring," Landslides, 2009, pp. 61-68, vol. 6, No. 1.
Zou et al., "Rapid miniature fiber optic pressure sensors for blast wave measurements," Optics and Lasers in Engineering, 2013, pp. 134-139, vol. 51, No. 2, Elsevier.
TenCate GeoDetect S-BR, 2011, 2 pages.
Non-Destructive Testing Market: Global Forecast to 2022, marketsandmarkets.com, 2017, 222 pages.

\* cited by examiner

SENSING TEXTILE

CROSS-REFERENCE TO RELATED APPLICATIONS

This application claims priority under 35 U.S.C. § 119(e) to U.S. Provisional Patent Application No. 62/521,099, entitled "Sensing Textile," by Nancy E. Brown et al., filed Jun. 16, 2017, which is assigned to the current assignee hereof and incorporated herein by reference in its entirety.

FIELD OF THE DISCLOSURE

The present disclosure relates to sensing textiles with at least one assembly of optical fiber filaments.

BACKGROUND

Civil infrastructure includes roadways, tunnels, pipelines, highways, bridges, railroad, and the like. Repairing civil infrastructure is costly and can be inefficient process if the only indicator is failure of a structure. However, current monitoring technology may not provide the measurement capabilities desired such as ease of use, low cost, detecting functionality, and monitoring functionality. Accordingly, a need continues to exist in the art for a sensing textile to meet current, new and sometimes demanding applications.

SUMMARY

In an embodiment, a sensing textile includes at least one assembly of optical fiber filaments, wherein the sensing textile has a main direction and a cross direction, and wherein the at least one assembly of optical fiber filaments is oriented at any angle measured relative to the cross direction.

In another embodiment, a sensing textile includes a carrier including a fabric, a film, or combination thereof; and at least one assembly of optical fiber filaments including a plurality of optical fiber filaments that are generally parallel to each other, wherein the sensing textile has a main direction and a cross direction, and wherein the at least one assembly of optical fiber filaments is oriented in the main direction of the sensing textile.

In yet another embodiment, a sensing textile includes at least one assembly of optical fiber filaments including a plurality of optical fiber filaments that are generally parallel to each other, wherein the sensing textile has a main direction and a cross direction, and wherein the at least one assembly of optical fiber filaments is oriented in the main direction of the sensing textile; and a second assembly of filaments, wherein the second assembly of filaments includes a plurality of filaments that are generally parallel to each other and cross over the at least one assembly of optical fiber filaments at a crossing angle.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

Before addressing details of the embodiments described below, some terms are defined or clarified. The term "filament" is intended to mean an elongated structure or fiber of any suitable length. The term "yarn" is intended to mean an ordered bundle of filaments. The term "scrim" is intended to mean a fabric that includes at least two filaments oriented in two different directions. For example, one or more filaments can be oriented in the "warp," "main," or "machine" direction that, in an embodiment, can be parallel to the length of the scrim. Another filament or filaments can be oriented in the "weft," "fill," "90," or "cross" direction that, in an embodiment, can be parallel to the width of the scrim. The term "0/90 scrim" or "square scrim" is intended to mean a fabric in which at least one filament is oriented in the main direction parallel to the length of the scrim, at least one filament is oriented in the cross direction parallel to the width of the scrim, and the cross direction is perpendicular to the main direction. The term "laid scrim" is intended to mean a scrim in which at least one filament overlies at least one other filament to create the scrim.

As used herein, the terms "comprises", "comprising", "includes", "including", "has", "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

In an embodiment, the present invention provides a sensing textile including at least one assembly of optical fiber filaments. The sensing textile has a main direction and a cross direction and the at least one assembly of optical fiber filaments is oriented at any angle measured relative to the cross direction. In an embodiment, the present invention provides a sensing textile including a carrier and at least one assembly of optical fiber filaments overlying the carrier. In an embodiment, the present invention provides a sensing textile including at least one assembly of optical fiber filaments and a second assembly of filaments. In a particular embodiment, the second assembly of filaments crosses over the at least one assembly of optical fiber filaments at a crossing angle. Advantageously, the sensing textile as described herein can provide any user to monitor and detect damage of any structure to which it is attached, which in turn can minimize maintenance costs, environmental impacts, and disruption to the population.

The at least one assembly of optical fiber filaments includes any reasonable optical fiber filament. For instance, the optical fiber filament includes a single-mode optical fiber, a multi-mode optical fiber, or combination thereof. A "single-mode optical fiber" as used herein refers to an optical fiber filament designed to carry a single light pulse in at least one direction down the optical fiber at a wavelength. A "multi-mode optical fiber" as used herein refers to an optical fiber filament that is designed to carry greater than one light pulse, each light pulse having a different wavelength, in at least one direction. With the single mode or multi-mode optical fiber filament, the pulse of light is carried in at least one direction through the optical fiber filament and measured by any method. Any operating light wavelength for the optical fiber filament is envisioned. Exemplary light wavelengths include a range of $10^{-6}$ nanometers (nm) to $10^6$ nm. Any reasonable value between the minimum and maximum values are envisioned.

Typically, the at least one assembly of optical fiber filaments is in communication with an interrogator. Any form of communication is envisioned such as wired, wireless, or combination thereof. The interrogator measures any value generated by the optical fiber from the pulsed light. Any reasonable interrogator is envisioned to measure the value, wherein a change in the value represents an environmental change. In an embodiment, the interrogator is transmissive when the interrogator is at a proximal end of the at least one assembly of optical fiber filaments with the pulsed light sent from a distal end of the at least one assembly of optical fiber filaments. In an alternative embodiment, the interrogator is reflective when the interrogator is at a proximal end of the at least one assembly of optical fiber filaments with the pulsed light sent from a proximal end of the at least one assembly of optical fiber filaments to the distal end of the at least one assembly of optical fiber filaments and back to the proximal end. The interrogator includes, but is not limited to, an optical time domain reflectometer (OTDR), an optical time domain analysis (OTDA), an Brillouin optical time domain reflectometer (BOTDR), an Brillouin optical time domain analysis (BOTDA), a Fiber Bragg Grating (FBG), any other interrogator technology, or combination thereof.

The optical fiber filament may be made with any reasonable material and may be a monofilament or a multifilament. As used herein, a "monofilament" includes a singular filament and a "multifilament" includes more than one monofilament. A multifilament may also be known as a "cable". A monofilament or a multifilament may include a coating, a cladding, or combination thereof that encompasses at least a portion of a circumference and a length of the optical fiber filament. In an embodiment, a multifilament includes a plurality of monofilaments where each monofilament may or may not include a coating, a cladding, or combination thereof. In an embodiment, the coating, the cladding, or combination thereof on the monofilament, multifilament, or combination thereof may be any reasonable material, such as a polymer. Any polymer includes a thermoplastic polymer, a thermoset polymer, a blend, or combination thereof. In a particular embodiment, the cladding is a fluoropolymer.

The at least one assembly of optical fiber filaments may be made of any reasonable material envisioned for an optical fiber filament. For instance, the optical fiber filament may include a glass fiber, a polymer fiber, or a blend thereof. Any reasonable glass optical fiber filament is envisioned and includes, but is not limited to, for example, silica, SMF-28®, SMF-28e+®, and the like. Any polymer optical fiber filament is envisioned and includes, but is not limited to, for example, an acrylic, such as polymethyl methacrylate (PMMA), fluorinated acrylate, and the like. For example, the optical fiber may have a PMMA core with a fluoropolymer cladding, or a fluorinated acrylate core with a fluoropolymer cladding. The optical fiber filament is a sensor that can be chosen depending upon the environmental change to be measured. In a particular embodiment, the optical fiber filament may be chosen depending upon an environmental change that is desired to be measured. In an embodiment, different materials may be used for the optical fiber filament to measure different environmental changes. For instance, the at least one assembly of optical fiber filaments includes a blend of a glass fiber and a polymer fiber, wherein the glass fiber is a first sensor and the polymer fiber is a second sensor, wherein the first sensor measures a first environmental change and the second sensor measures a second environmental change, wherein the first environmental change is different than the second environmental change. Any combination and number of optical fiber filaments is envisioned depending upon the environmental change that is desired to be measured.

In an embodiment, the sensing textile includes at least one assembly of optical fiber filaments. In a particular embodiment, the at least one assembly of optical fiber filaments includes a plurality of filaments of monofilaments or multifilaments that are generally parallel to each other. The plurality of filaments that are parallel to each other may be evenly spaced or randomly spaced, depending on the configuration and measurement resolution desired. Further, the at least one assembly of optical fiber filaments is oriented at any suitable angle. For instance, any suitable angle may be any angle measured relative to the cross direction of the sensing textile. In an embodiment, the at least one assembly of optical fiber filaments can be oriented at any angle between 0 degrees and 90 degrees relative to the cross direction of the sensing textile. In a particular embodiment, the at least one assembly of optical fiber filaments extends generally parallel to a main direction of the sensing textile, where the main direction is 90 degrees relative to the cross direction. In an embodiment, it is envisioned that the at least one assembly of optical fiber filaments can be oriented at a suitable angle and also can be oriented at a positive value, a negative value, or a combination thereof. Any suitable positive or negative value is envisioned. For example, the at least one assembly of optical fiber filaments is oriented at a first angle (e.g., 45°), and also can be oriented at a positive value of the first angle (e.g., +45°), a negative value of the first angle (e.g., −45°), or a combination thereof. In an example, the at least one assembly of optical fiber filaments extends along any length envisioned of the sensing textile. In an example, the at least one assembly of optical fiber filaments extends along the entire length of the sensing textile.

The at least one assembly of optical fiber filaments can include a monofilament or it can include any number of filaments per assembly, such as greater than 2 filaments, or greater than 5 filaments. In an embodiment, the assembly includes less than 1,000 filaments per assembly, such as less than 500 filaments or less than 100 filaments. A typical range can be 1 to 1,000 filaments per assembly. Any reasonable value between the minimum and maximum values are envisioned. In an embodiment, the at least one assembly of optical fibers filaments can have any reasonable diameter. For instance, the diameter of the core of the optical fiber filament without any coating or cladding may be greater than about 1 micrometer, such as about 1 micrometer to about 3000 micrometers, such as about 1 micrometer to about 2000 micrometers, such as about 1 micrometer to 500 micrometers, or even about 1 micrometer to about 100 micrometers. Any reasonable value between the minimum and maximum values are envisioned.

In an embodiment, the sensing textile further includes a second assembly of filaments. In a particular embodiment, the second assembly of filaments includes a plurality of filaments that are generally parallel to each other that may be evenly spaced or randomly spaced. In a more particular embodiment, the second assembly of filaments crosses over the at least one assembly of optical fiber filaments at a crossing angle. In an embodiment, the second assembly of filaments can be oriented at any angle between 0 degrees and 90 degrees relative to the cross direction of the sensing textile. In a particular embodiment, the second assembly of filaments extend generally parallel (i.e. 0 degrees relative) to a cross direction of the sensing textile. In an embodiment, it is envisioned that the second assembly of filaments can be oriented at a suitable angle and also can be oriented at a positive value, a negative value, or a combination thereof. Any suitable positive or negative value is envisioned. In an example, the second assembly of filaments extends along any length envisioned of the sensing textile.

The second assembly of filaments can include, for example, one or more filaments of any suitable material. In an embodiment, the second assembly of filaments may include an organic material, an inorganic material, or combination thereof. The organic material, the inorganic material, or combination thereof for the second assembly of filaments includes, for instance, a polymer, a glass, a carbon, a Basalt fiber, or combination thereof. A polymer includes a thermoplastic, a thermoset, or combination thereof. In an embodiment, the polymer includes a polyester, an aramid, a ultra high molecular weight polyethylene (UHMWPE), a poly(p-phenylene-2,6-benzobisoxazole), an aromatic polyester, a polyolefin, a polyvinyl alcohol (PVA), or any combination thereof. The glass may be of any suitable composition or filament diameter or TEX such as E, C, AR, rovings of any TEX, twisted yarns of any TEX, combinations thereof, and the like. In an embodiment, the second assembly of filaments can include a polyester filament, an aramid filament, a carbon fiber filament, or combination thereof. In an embodiment, the second assembly of filaments includes an optical fiber filament, a non-optical fiber filament, or combination thereof. In a particular embodiment, the second assembly of filaments may be an optical fiber filament as described above. When the second assembly of filaments is an optical fiber filament, the optical fiber filament may be chosen to measure the same or a different environmental change than the at least one assembly of optical fiber filaments. A "non-optical fiber filament" as used herein refers to a filament that does not have optical fiber capabilities and may include any of the inorganic or organic materials for the second assembly of filaments described above.

It is further envisioned that the sensing textile can include any suitable combination of filament materials. For example, industrial considerations such as ultraviolet degradation, chemical resistance (including resistance to alkaline chemicals), bonding behavior, and the amount of flexibility in the material can guide the decision to combine complimentary filament materials in the sensing textile. In an embodiment, the sensing textile can include an ultra high molecular weight polyethylene material, for its flexibility characteristics. In another embodiment, the sensing textile can include a polyolefin for its ability to protect a laminate or composite product from impact and chemical breakdown. In yet another embodiment, the sensing textile can include Basalt, for its tensile strength, alkali resistance and natural fiber content, in combination with, for example, fiberglass, a polyolefin, or an ultra high molecular weight polyethylene material.

The second assembly of filaments can include a monofilament or it can include any number of filaments per assembly such as greater than 2 filaments, or greater than 5 filaments, such as greater than 50 filaments, greater than 100 filaments, greater than 200 filaments, greater than 500 filaments, or greater than 1,000 filaments. In an embodiment, the assembly includes less than 300,000 filaments per assembly, such as less than 200,000 filaments, or less than 100,000 filaments. In an embodiment, the range can be 1,000 to 60,000 filaments per assembly. Any reasonable value between the minimum and maximum values are envisioned. In an embodiment, the diameter of the second assembly of filaments may be greater than about 1 micrometer, such as about 1 micrometer to about 3000 micrometers, such as about 1 micrometer to about 2000 micrometers, such as about 1 micrometer to 500 micrometers, or even about 1 micrometer to about 100 micrometers. Any reasonable value between the minimum and maximum values are envisioned.

As discussed, the at least one assembly of optical fiber filaments of the sensing textile includes a plurality of optical fiber filaments that are generally parallel to each other. Any suitable spacing is envisioned between adjacent optical fiber filaments. The at least one assembly of optical fiber filaments has the same or different spacing between adjacent optical fiber filaments depending upon the specific tensile and weight considerations desired for the sensing textiles. Likewise, any suitable spacing is envisioned between the second assembly of filaments that includes a plurality of filaments that are generally parallel to each other. In general, any suitable spacing is envisioned for the second assembly of filaments and accordingly, between adjacent filaments. The second assembly of filaments has the same or different spacing between adjacent filaments depending upon the specific tensile and weight considerations desired for the sensing textiles. For example, assemblies of filaments that are more closely spaced and that include a higher modulus and denier can create a stronger sensing textile. Assembly spacing can also be affected by the particular material or materials used in the sensing textile to meet an industrial specification and/or desired measurement resolution (i.e. with the optical fibers). Any reasonable spacing is envisioned. Spacing between adjacent optical fiber filaments of the at least one assembly optical fiber filaments includes, for instance, at least 0.25 filaments per inch. Spacing between adjacent filaments of the second assembly of filaments includes, for instance, at least 0.25 filaments per inch. Any reasonable value above the minimum values is envisioned.

In an embodiment, the at least one assembly of optical fiber filaments and the second assembly of filaments are knit, woven, laid, or combination thereof. In an embodiment, the sensing textile can consist essentially of at least one assembly of optical fiber filaments and a second assembly of filaments. In a particular embodiment, the sensing textile can consist of at least one assembly of optical fiber filaments and a second assembly of filaments. In another embodiment, the sensing textile can include any number of assembly of filaments, each of which can include the same or different spacing between the assemblies of filaments, and the same or different filamentary materials, such as, for example, an optical fiber filament, a non-optical fiber filament, or combination thereof.

Each of the assemblies of filaments for the sensing textile can include various configurations of filaments within each assembly. In an embodiment, any of the assemblies of optical fiber filaments and/or the assemblies of filaments can include a flattened, substantially untwisted ribbon-like configuration of filaments, such as a tow or a tape. By "substantially untwisted," it is meant that the assembly of filaments can include less than 0.5 twists per centimeter, such as less than 0.4, less than 0.25, or even less than 0.1 twists per centimeter. For example, any of the assemblies of optical fiber filaments and/or the assemblies of filaments can include any filaments in a ribbon-like fiber tow that includes a bundle of elongated and orderly filaments that are flattened and substantially untwisted. In another embodiment, any of the assemblies of optical fiber filaments and/or the assemblies of filaments can be configured to include an ordered or unordered bundle of filaments. For example, any of the assemblies of optical fiber filaments and/or the assemblies of filaments can be configured as an unordered bundle of filaments, such as a roving, or as an ordered bundle of filaments, such as a yarn with one or more plies. In both instances of a roving and a yarn, the configuration of the filaments may include any reasonable amount of twist applied to the filaments or bundle.

The configuration of each of the assemblies of filaments for the sensing textile can include various dimensions. For example, any of the assemblies of optical fiber filaments and/or the assemblies of filaments can include a cross-section that has an aspect ratio defined as a ratio of the width of the assembly of filaments to the height of the assembly of filaments. In an embodiment, the assembly of filaments can include an aspect ratio value less than 50:1, such as 10:1 for an assembly of filaments. In another embodiment, the assembly of filaments can include an aspect ratio value greater than 2:1, such as 3:1, such as 5:1, or such as 7:1, or such as 10:1. Each of the assemblies of optical fiber filaments and/or the assemblies of filaments can have the same or different materials, number of filaments, configurations, aspect ratios, and the like depending on the properties desired for the sensing textile.

In an embodiment, the sensing textile of the present application can include one or more suitable carriers. Any suitable position of the carrier is envisioned. The carrier can include any reasonable substrate onto which or under which one or more assemblies of filaments, such as the at least one assembly of optical fiber filaments, the second assembly of filaments, or combination thereof, can be supported.

In an embodiment, the carrier can include any suitable material such as a fabric, a film, such as a polymer film, or combination thereof. For instance, the carrier may include an organic material, an inorganic material, or combination thereof. In an embodiment, the carrier may include an organic material such as a polymer material, including a thermoplastic, a thermoset, or combination thereof. In an example, the organic material, the inorganic material, or combination thereof may include a polyester, an aramid, an ultra high molecular weight polyethylene (UHMWPE), a poly(p-phenylene-2,6-benzobisoxazole), an aromatic polyester, a polyolefin, a polyvinyl alcohol (PVA), a carbon, a Basalt fiber, a glass, or any combination thereof. The glass may be of any suitable composition or filament diameter or TEX such as E, C, AR, rovings of any TEX, twisted yarns of any TEX, fiber optic filaments, combinations thereof, and the like. In a particular embodiment, the carrier can include a material such as a polyester, an aramid, or any combination thereof. Any suitable color or combination of colors is envisioned for the carrier. The carrier also can include any suitable configuration, including any suitable substrate configuration to support the at least one assembly of optical fiber filaments and/or the second assembly of filaments in general. Any thickness of the carrier is envisioned and includes any reasonable value. In an embodiment, the carrier has a thickness of at least 0.1 mil, such as at least 1.0 mil. In a particular embodiment, the carrier is a film that has a thickness of at least 0.1 mil, such as at least 1.0 mil. Any reasonable value above this minimum value is envisioned.

In an embodiment, the carrier can include a fabric that is woven, nonwoven, laminated, knit, or combination thereof having a certain configuration of yarns. In an embodiment, the fabric includes at least one set of yarns oriented at any angle between 0 degrees and 90 degrees relative to the cross direction of the sensing textile. In a particular embodiment, the fabric includes a first set of yarns and a second set of yarns oriented at any angle between 0 degrees and 90 degrees relative to the cross direction of the sensing textile. Any number of sets of yarns is envisioned at any angle envisioned. Within the carrier, it is envisioned that the at least one set of yarns, such as the first set of yarns, the second set of yarns, or combination thereof, can be oriented at a suitable angle and also can be oriented at a positive value, a negative value, or a combination thereof. Any suitable positive or negative value is envisioned for the first set of yarns, the second set of yarns, or combination thereof.

In an embodiment, the fabric is a non-woven scrim and in a more particular embodiment, a laid scrim. Any suitable configuration is envisioned for the laid scrim. In an exemplary embodiment, the carrier includes a non-woven laid scrim, such as a nonwoven 0/90 scrim. For example, the carrier can include a first set of yarns, such as a plurality of yarns, such as for example, polyester yarns or aramid yarns, or a combination of these yarns, extending generally parallel in a first direction of the sensing textile. The carrier can also include a second set of yarns, such as another plurality of yarns, such as, for example, polyester yarns or aramid yarns, or a combination of these yarns, extending generally parallel in a second direction of the nonwoven laid scrim that is different than the first direction of the first set of yarns and that can overlie or lie underneath the first set of yarns. In an exemplary embodiment, the carrier can include a mix or blend of more than one yarn in at least one of the directions of the nonwoven laid scrim. For example, a carrier can be made with polyester and aramid yarns. For instance, every fourth yarn in the second, or cross direction, can be an aramid yarn to increase the fill strength (e.g., the tensile strength in the cross or fill direction) of the carrier, including an increase in fill strength of at least 25%. Any suitable configuration other than a laid scrim also is envisioned for the carrier, including the use of one or more filamentary materials and the use of filaments in configurations other than that of yarns.

In a particular embodiment, the carrier can include a 0/90 scrim, where the cross direction of the scrim is generally perpendicular to the main direction of the scrim. The first set of yarns extend generally parallel in the main direction and the second set of yarns extend generally parallel in the cross direction. In an embodiment, the carrier includes at least one main direction yarn oriented parallel to the main direction of the sensing textile and at least one cross direction yarn oriented parallel to the cross direction of the sensing textile. The first set of yarns can include a yarn spaced apart from and generally parallel to an adjacent yarn extending in the same direction by any suitable distance. The first set of yarns also can include the same or different distances between adjacent yarns. Similarly, the second set of yarns can include a yarn spaced apart from and generally parallel to an adjacent yarn extending in the same direction by any suitable distance. The second set of yarns also can include the same or different distances between adjacent yarns. In general, any suitable spacing is envisioned between adjacent yarns, depending upon the specific tensile and weight considerations desired for a carrier. For example, yarns that are more closely spaced and that include a higher modulus and denier can create a stronger carrier. Yarn spacing can also be affected by the particular yarn material or materials used to meet an industrial specification. Moreover, the sensing textile can include a variety of carriers, each of which can include different configurations, different spacing between the yarns or filaments, and different yarn or filamentary materials. Any reasonable spacing is envisioned. Spacing for the first set of yarns, the second set of yarns, or combination thereof includes, for instance, at least 0.25 yarns per inch. Any reasonable value above the minimum value is envisioned.

When present, the carrier of the sensing textile can stabilize and support the at least one assembly of optical fiber filaments and can provide structure to the sensing textile to enhance handling of the sensing textile. Any number of carriers may be envisioned, including any suitable number of carriers in light of industrial considerations such as the overall areal weight of the sensing textile. In an embodiment, the sensing textile can include a carrier and at least one assembly of optical fiber filaments. In an embodiment, the at least one assembly of optical fiber filaments can overlie the carrier and can be oriented in a direction parallel to the main direction of the sensing textile. In another embodiment, a carrier may be interposed between separate layers of assemblies of filaments, such as optical fiber filaments and second assembly of filaments, on top of separate layers of assemblies of filaments, or both.

In an embodiment, the sensing textile can consist essentially of a carrier and at least one assembly of optical fiber filaments. In a particular embodiment, the sensing textile can consist of a carrier and at least one assembly of optical fiber filaments. In a further embodiment, the sensing textile can consist essentially of a first carrier, at least one assembly of optical fiber filaments, and a second carrier. In a particular embodiment, the sensing textile can consist of a first carrier, at least one assembly of optical fiber filaments, and a second carrier. In yet another embodiment, the sensing textile can consist essentially of a carrier, at least one assembly of optical fiber filaments, and a second assembly of filaments.

In a particular embodiment, the sensing textile can consist of a carrier, at least one assembly of optical fiber filaments, and a second assembly of filaments. In yet another embodiment, the sensing textile can consist essentially of a first carrier, at least one assembly of optical fiber filaments, a second assembly of filaments, and a second carrier. In a particular embodiment, the sensing textile can consist of a first carrier, at least one assembly of optical fiber filaments, a second assembly of filaments, and a second carrier.

The layers of the sensing textile may be stabilized and fixed using various approaches. Any method is envisioned such as a coating, stitching, heating, the like, or combination thereof. In an embodiment, any of the carrier, the at least one assembly of optical fiber filaments, the second assembly of filaments, or combination thereof can include a coating to provide a bond between adjacent layers such as the at least one assembly of optical fiber filaments and the second assembly of filaments, the carrier and the at least one assembly of optical fiber filaments, or any combination thereof. For instance, the coating may be on one or both sides of the layer. In an embodiment, the carrier may include the coating on one or both sides. In an embodiment, the at least one assembly of optical fiber filaments may include the coating on one or both sides. In an embodiment, the second assembly of filaments may include the coating on one or both sides.

In an embodiment, any suitable coating may be envisioned that provides a bond to an adjacent layer. In a particular embodiment, the coating can include an adhesive coating, such as a thermoplastic adhesive binder, a thermosetting adhesive binder, or any combination thereof. If desired, the coating can be non-tacky at room temperature. One advantage to the use of an adhesive coating when applied to one of the layers of the sensing textile, such as a carrier, is its ability to increase the shear strength of a product (e.g., a laminated product or composite part) into which it is incorporated. A second advantage is that an adhesive coating provides less bulk or weight to the sensing textile than stitching. Yet another advantage is that an adhesive coating can be applied to one or more layers of the sensing textile during its production at a much faster rate than another means of stabilizing or fixing the layers of the sensing textile (e.g., stitching) during its production. A still further advantage to using an adhesive coating is the stability that the adhesive coating affords to the sensing textile. For example, using an adhesive coating enables the sensing textile to be more versatile in end use applications, such as by allowing the nonwoven laid scrim to be placed into a mold (e.g., "preforming" the material) as part of a molding process before the introduction of a resin or resin system.

The same or different coating may be used to provide a bond between adjacent layers. In an embodiment, the bond between adjacent layers may be activated under conditions such as heat, pressure, or a combination thereof. During manufacturing, the sensing textile may be heated to allow the coating to secure the layers of the sensing textile to one another and to fix the appropriate assembly of optical fiber filaments and/or assembly of filaments to each other, to a carrier layer, or combination thereof, within the sensing textile, all of which can enhance the stability, durability, and strength of the sensing textile. In an embodiment, the sensing textile does not use a coating for at least one of the layers. In another embodiment, the sensing textile does not use stitching for at least one of the layers. In an embodiment, the sensing textile has a combination of a coating and a stitching, depending on the final properties desired. In a further embodiment, the sensing textile does not use a film to secure any of the layers. More specifically, the coating may be placed on the at least one assembly of optical fiber filaments and/or second assembly of filaments of one or more layers, but is not a continuous film that covers any openings that may be present in one or more of the layers. In an alternative embodiment, the coating may be a continuous film.

The sensing textile can include any number of additional layers such as a reinforcing layer, a carrier layer, a unidirectional layer, an adhesive layer, a release liner, the like, or combination thereof. When present, any suitable configuration or placement of the additional layer is envisioned within the sensing textile. Any material is envisioned for the additional layer. In an embodiment, the additional layer may include any reasonable material in any suitable configuration, such as a film, a fabric, or any combination thereof. In an embodiment, the sensing textile may include an adhesive layer on a surface of the sensing textile that is to directly contact a structure. For instance, the adhesive layer may be used to adhesively attach the sensing textile to the structure. Any surface is envisioned depending on the configuration of the sensing textile. For instance, the adhesive layer may be on at least one side of the carrier with the at least one assembly of optical fibers on an opposite side. In another embodiment, the adhesive layer may be on the at least one side of the at least one assembly of optical fiber filaments with the second assembly of filaments on an opposite side. Any adhesive in envisioned. In an embodiment, the adhesive is any reasonable material used as a construction adhesive. In a particular embodiment, the construction adhesive includes, but is not limited to, for example, a thermoset adhesive polymer, a thermoplastic adhesive polymer, a pressure sensitive adhesive, a plaster, a cement, the like, or combination thereof. When an adhesive is used, a release liner may be particularly useful on the sensing textile for handling, storage, transportation, and the like. In an embodiment, the sensing textile may not include any additional layers.

Figure 1:
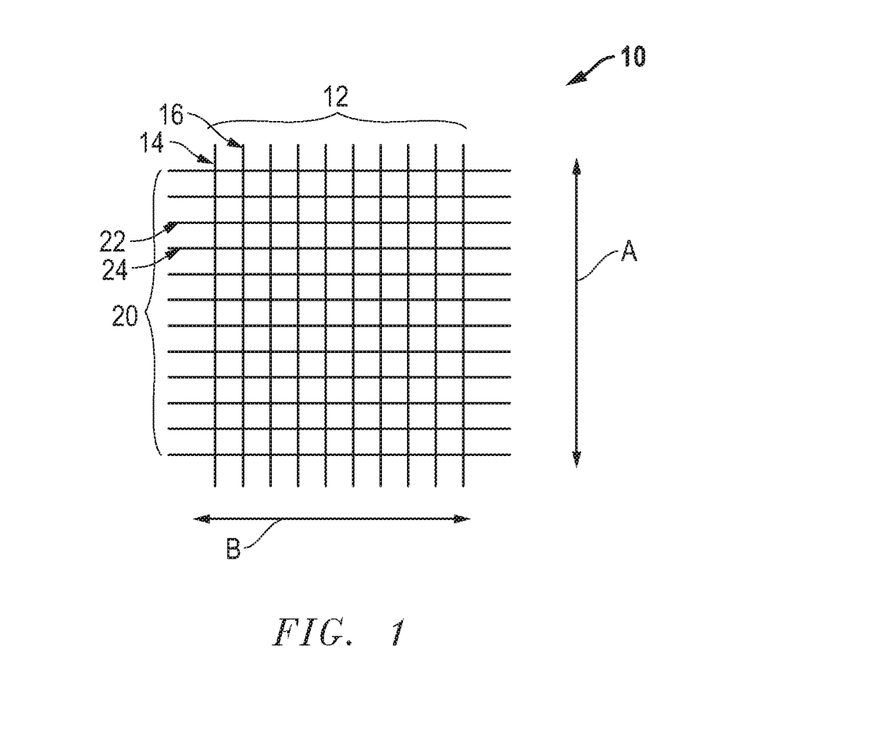
FIG. 1 includes an overhead view of a sensing textile illustrated in accordance with an embodiment described herein.

Turning to FIG. 1, a sensing textile is illustrated. The sensing textile 10 includes at least one assembly of optical fiber filaments 12 that extend generally parallel to direction A of the sensing textile 10, also known as the machine direction that extends along the length of the sensing textile 10. The at least one assembly of optical fiber filaments 12 includes a first optical fiber filament 14 and a second optical fiber filament 16. In an embodiment, the sensing textile 10 includes a second assembly of filaments 20 that extend generally parallel to direction B of the sensing textile 10, also know as the cross direction that extends along the width of the sensing textile. The second assembly of filaments 20 includes a first fiber filament 22 and a second fiber filament 24. As illustrated, the at least one assembly of optical fiber filaments 12 can be 90 degrees relative to the cross direction of the sensing textile 10 and the second assembly of filament 20 can be 0 degrees relative to the cross direction of the sensing textile 10.

In an embodiment, the at least one assembly of optical fiber filaments 12 may be a glass fiber, a polymer fiber, or combination thereof. The at least one assembly of optical fiber filaments 12 can include any configuration for each and any parallel strand 14, 16 within the sensing textile 10. For instance, a first optical fiber filament 14 may be the same or different material or configuration than a second optical fiber filament 16 that is parallel to the first optical fiber filament 14. For instance, the first optical fiber filament 14 may be a polymer optical fiber filament and the second optical fiber filament 16 may be a glass optical fiber filament. In a further embodiment, first optical fiber filament 14, second optical fiber filament 16, or combination thereof may be a monofilament, a multifilament, or combination thereof. Although illustrated as evenly spaced, the first optical fiber filament 14 and second optical fiber filament 16 may be configured in any spacing envisioned.

The at least one assembly of optical fiber filaments 12 can cross over or be crossed over by the second assembly of filaments 20 at any crossing angle. In an embodiment, the first optical fiber filament 14 and second optical fiber filament 16 can cross with the first fiber filament 22 and the second fiber filament 24 in any manner envisioned such as, for example, knit, woven, laid, or combination thereof. Further, any knit or weave is envisioned using any reasonable weave. Although illustrated as a laid scrim, in a particular embodiment, the at least one assembly of optical fiber filaments 12 and the second assembly of filaments 20 are configured in a plain weave where each of the second assembly of filaments 20 are carried over and under each of the at least one assembly of optical fiber filaments 12, with each row of the second assembly of filaments alternating, to produce a high number of intersections between the at least one assembly of optical fiber filaments and the second assembly of filaments. In another embodiment, the at least one assembly of optical fiber filaments 12 and the second assembly of filaments 20 can be configured in a leno weave where two or more at least one assembly of optical fiber filaments 12 can be twisted around each other as they are interlaced with one or more second assembly of filaments 20, or they can be configured in a half-leno weave. For each weave used, the configurations of the at least one assembly of optical fiber filaments 12 and the second assembly of filaments 20 can also be altered by changing the densities (e.g., increasing or decreasing the number of fibers in a given distance, such as increasing or decreasing the number of fibers per inch) of either or both of the at least one assembly of optical fiber filaments 12 and the second assembly of filaments 20 in their respective directions.

The second assembly of filaments 20 can include any configuration of each and any parallel strand within the sensing textile 10. For instance, a first fiber filament 22 may be the same or different configuration or material than a second fiber filament 24 that is parallel to first fiber filament 22. The second assembly of filaments 20 may be an organic material, an inorganic material, or combination thereof. Further, the second assembly of filaments 20 may include an optical fiber filament, a non-optical fiber filament, or combination thereof.

In an example, the first fiber filament 22 may be an optical fiber filament and the second fiber filament 24 may be a non-optical fiber filament. When the second assembly of filaments 20 includes an optical fiber filament, they may be the same or different than the at least one assembly of optical fiber filaments 12. In another example, the first fiber filament 22 may be a non-optical fiber filament and the second fiber filament 24 may be a non-optical fiber filament that may be the same or different than the first fiber filament 22. Although illustrated as evenly spaced, the first fiber filament 22 and second fiber filament 24 may be configured in any spacing envisioned. Although a 90 degree angle is illustrated between the at least one assembly of optical fiber filaments 12 and the second assembly of filaments 20, any angle is envisioned. Although sensing textile 10 with the at least one assembly of optical fiber filaments 12 is described with a second assembly of filaments 20, any number of assemblies of filaments can be envisioned at any angle envisioned.

Although not illustrated, the sensing textile 10 can further include any additional layer. Any additional layer is envisioned. For instance, the sensing textile 10 can include any carrier and any configuration of the carrier within the sensing textile is envisioned. Furthermore, a coating (not illustrated) may be present between the at least one assembly of optical fiber filaments 12 and the second assembly of filaments 20 to provide a bond between the at least one assembly of optical fiber filaments 12 and the second assembly of filaments 20.

Figure 2:
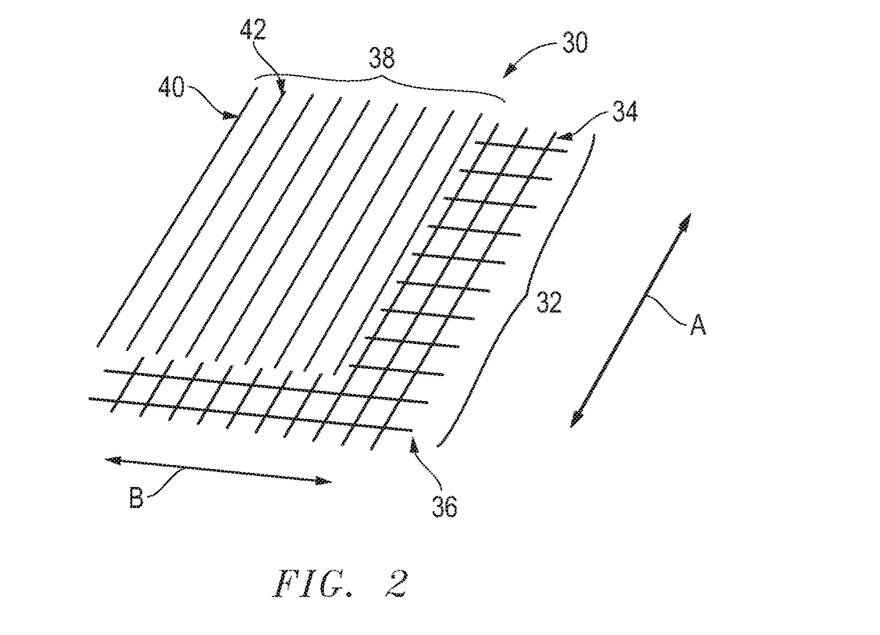
FIG. 2 includes a perspective view of a sensing textile illustrated in accordance with an embodiment described herein.

Turning to FIG. 2, a sensing textile 30 is illustrated from a perspective view. The sensing textile 30 includes a carrier 32 that can include any configuration envisioned. For instance, the carrier 32 may include a fabric having a first set of yarns 34 that extend generally parallel to direction A, also known as the main direction or along the length of the sensing textile 30, and a second set of yarns 36 that extend generally parallel to the cross direction (across the width of the sensing textile 30) and generally perpendicular to the main direction. In an exemplary embodiment, the carrier 32 is illustrated as a scrim, such as non-woven, laid scrim and, more particularly, 0/90 scrim. Yarns 34 and 36 can include any suitable materials as described above and include any suitable configuration. In an embodiment, carrier 32 can include yarns that all include the same material such as polyester, or can include yarns that include different materials, such as alternating polyester yarns with aramid yarns. Further, carrier 32 can have the same or different configurations and yarns, depending upon the desired final properties of the sensing textile 30. Although illustrated as a laid scrim, any fabric configuration is envisioned. In an embodiment, the carrier 32 may be a polymer film.

The at least one assembly of optical fiber filaments 38 includes a first optical fiber filament 40 and a second optical fiber filament 42 overlying carrier 32. In an embodiment, the at least one assembly of optical fiber filaments 38 may be a glass fiber, a polymer fiber, or combination thereof. The at least one assembly of optical fiber filaments 38 can include any configuration for each and any parallel strand 40, 42 within the sensing textile 30. For instance, a first optical fiber filament 40 may be the same or different material or configuration than a second optical fiber filament 42 that is parallel to the first optical fiber filament 40. First optical fiber filament 40, second optical fiber filament 42, or combination thereof may be a monofilament, a multifilament, or combination thereof. Although illustrated as evenly spaced, the first optical fiber filament 40 and second optical fiber filament 42 may be configured in any spacing envisioned.

The at least one assembly of optical fiber filaments 38 can be adhered to and fixed in place to carrier 32 by any reasonable method. For instance, the at least one assembly of optical fiber filaments 38 can be adhered to and fixed in place to carrier 32 by a coating, stitching, laminating, or any combination thereof (not shown).

Although sensing textile 30 is illustrated with the at least one assembly of optical fiber filaments 38, any number of assemblies of filaments can be envisioned at any angle envisioned. For instance, the sensing textile 30 may include a second assembly of filaments (as illustrated in FIG. 1). Although not illustrated, the sensing textile 30 can further include any additional layer. Any additional layer is envisioned as described above. Any carrier and any configuration of the carrier within the sensing textile 30 are envisioned.

Any means of producing a sensing textile is also provided. For instance, the sensing textile may be produced by a batch process, a roll-to-roll process, or combination thereof. In an embodiment, when a carrier is present, it can be unrolled from an unwind stand or any other reasonable storage means prior to placing the at least one assembly of optical fiber filaments. At least one assembly of optical fiber filaments can overlie the carrier. At least one assembly of optical fiber filaments can be laid or otherwise positioned such that the at least one assembly of optical fiber filaments overlies the carrier at any reasonable angle relative to the cross-direction of the carrier. The at least one assembly of optical fiber filaments can be spaced apart from and can, in an embodiment, be oriented generally parallel to, an adjacent assembly of optical fiber filaments. Any suitable spacing is envisioned, including the same or different spacing between adjacent assemblies of optical fiber filaments. When a second assembly of filaments is present, it can be overlaid on the at least one assembly of optical fiber filaments. In a particular embodiment, the second assembly of filaments are overlaid on the at least one assembly of optical fiber filaments at any angle and at any spacing envisioned, with or without an additional layer interposed between the at least one assembly of optical fiber filaments and the second assembly of filaments. In a particular embodiment, when the at least one assembly of optical fiber filaments are laid, i.e. non-woven, with the second assembly of filaments, they may be laid together prior to placing on the carrier. In an embodiment, the second assembly of filaments are woven by any reasonable means with the at least one assembly of optical fiber filaments at any reasonable angle. In a particular embodiment, when the second assembly of filaments are woven with the at least one assembly of optical fiber filaments, they are woven together prior to placing on the carrier. In an embodiment, any additional layer can be positioned within the sensing textile.

When a carrier is not present, at least one assembly of optical fiber filaments and second assembly of filaments can be laid or otherwise positioned such that the at least one assembly of optical fiber filaments and second assembly of filaments overlie one another. The at least one assembly of optical fiber filaments can be spaced apart from and can, in an embodiment, be oriented generally parallel to, an adjacent assembly of optical fiber filaments. Any suitable spacing is envisioned, including the same or different spacing between adjacent assemblies of optical fiber filaments. In a particular embodiment, the second assembly of filaments are laid on the at least one assembly of optical fiber filaments at any angle and at any spacing envisioned, with or without an additional layer interposed between the at least one assembly of optical fiber filaments and the second assembly of filaments. In an embodiment, the second assembly of filaments are woven by any reasonable means with the at least one assembly of optical fiber filaments at any reasonable angle. In an embodiment, any additional layer can be positioned within the sensing textile.

In an embodiment, a coating, such as a thermoplastic adhesive binder or thermosetting adhesive binder, can be placed on any surface of, when present, the carrier, the at least one assembly of optical fiber filaments, the second assembly of fibers, or combination thereof, to provide a bond between the carrier, the at least one assembly of optical fiber filaments, the second assembly of fibers, or combination thereof and its adjacent layer. Any method of providing the coating is envisioned and depends upon the coating chosen. In an embodiment, any portion of the sensing textile can be heated to activate the coating to allow the adhesive to stabilize the carrier, the at least one assembly of optical fiber filaments, the second assembly of fibers, or combination thereof of the sensing textile. In an embodiment, any of the layers, such as the carrier, the at least one assembly of optical fiber filaments, the second assembly of fibers, or combination thereof, may be stitched.

Any post-processing of the sensing textile may be applied, depending on the final product desired. For instance, the sensing textile can travel through rollers to complete the sensing textile. In an embodiment, the sensing textile is cut into strips. Any order of steps, providing the layers, and processing of the sensing textile is envisioned and is dependent upon the final properties desired.

A sensing textile as described herein can be used to meet new and sometimes demanding applications in both the public and private sector. In particular, the sensing textile can be used in a civil infrastructure monitoring system that will provide for monitoring of any infrastructure in a pro-active manner and enable damage detection to the infrastructure, thereby minimizing maintenance costs, environmental impact, and disruptions to the population. For instance, the sensing textile may be used to monitor and/or measure any environmental change desired. Exemplary measurements include strain, temperature, humidity, gas, radiation, stress, the like, or combination thereof. In a particular embodiment, the measurement of strain includes elongation (strain), bending (strain), vibration (strain as a function of time), or combination thereof. The strain may also be measured as a function of the position on or within the infrastructure. For instance, the sensing textile may be used to map any environment change, such as strain and temperature. In another example, the sensing textile may be used to measure occurrence of cracks on a rigid substrate or a flexible substrate.

Any size of the sensing textile is envisioned and includes any reasonable length or width. In an embodiment, the width of the sensing textile may be at least about 0.25 meters (m), such as about 0.25 meters to about 15 meters. In an embodiment, the length of the sensing textile may be at least about 0.25 meters, such as about 0.25 meters to 10,000 meters, such as about 0.5 meters to about 10,000 meters, such as about 1 meter to about 10,000 meters, such as about 5 meters to about 10,000 meters, or even about 10 meters to about 10,000 meters. In an embodiment, the sensing textile may be made into a tape for narrow width applications. For instance, the sensing textile may be cut along its length. For instance, the tape may have a width of at least 0.25 centimeters (cm), such as about 0.25 centimeters to about 25.4 centimeters. Any width or length is envisioned between the minimum and maximum values given above. Further, any weight of the sensing textile is envisioned. For instance, the sensing textile is at least about 0.5 ounces per square yard. Any reasonable value is envisioned above the minimum value. With the sensing textile, a plurality of optical fibers are used to measure any environmental change desired along a cross-section of the infrastructure, depending on the size of the sensing textile.

In particular, any number of different optical fibers may be used within the sensing textile to measure any number of different environmental changes to provide a more robust and tunable resolution of the infrastructure. For instance, a glass optical fiber may be used in combination with a polymer optical fiber, the polymer optical fiber chosen with a higher elongation than the glass optical fiber. As such, due to the relatively lower elongation of the glass optical fiber, a smaller amount of strain will cause the glass optical fiber to break whereas the polymer optical fiber may remain intact. As such, the breakage of the glass optical fiber would provide a caution indicator of failure with the infrastructure and the breakage of the polymer optical fiber would provide an indication that a relatively more substantial failure has occurred with the infrastructure.

In an embodiment, the material selection and configuration of the sensing textile is selected to provide resistance against degradation of the sensing textile. For instance, any configuration and selection of materials is envisioned such that the sensing textile has durability suitable for its intended use and maintains its efficacy for a prolonged period of time, such as months, years, or even decades. In an example, if the sensing textile is used outdoors, the sensing textile can be configured to have an exterior durability to withstand conditions such as, for instance, water, sun, wind, soil conditions, heat, cold, precipitation, and the like. In a particular embodiment, the sensing textile may be resistant to alkali aging so it does not degrade in an alkali environment.

Advantageously, the sensing textile can provide at least one or more of the following benefits: ease of installation, signal resolution, spatial coverage, and system reliability. In contrast, currently available optical fiber technology only allows localized and limited measurement coverage. The sensing textile of the present invention may be used with any application where measurement of any environmental change is desired. For instance, the sensing textile may be adjacent to any natural structure, any man-made structure, or combination thereof. Exemplary embodiments include, but are not limited to, the sensing textile being adjacent to, or even substantially integrated with, any earthen structure (e.g., a dam, an embankment, a landfill, and the like), any civil structure (e.g., a bridge, a road, a rail road, a building, and the like), any composite structure (e.g., a tank, a pipe, a vessel, an automotive composite, an aerospace composite, and the like), any membrane (e.g. a roofing membrane, a geo-grid or geo-membrane, and the like), or any combination thereof. A pipe includes, but is not limited to, any conduit for fluid, gas, or solid such as a gas line, a water line, a sewer, line, an oil line, or chemical processing pipe.

In an embodiment, the sensing textile can be used as one or more layers of a composite material used for the structure or used as a "skin" layer adjacent to, or even directly contacting, the structure that is to be monitored. As a "skin layer", the sensing textile may be attached by any reasonable means to a structure. In an embodiment, the sensing textile can be laminated to, bonded to, or coated on a structure. In an embodiment, the sensing textile laminated into a composite material. In an embodiment, the sensing textile has an adhesive layer on a surface that directly contacts the structure, enabling easy installation and application on the structure. The sensing textile can be positioned at variable distances within and/or along the composite and can also be combined with other structures. In a particular embodiment, the sensing textile as described herein can be used in particular applications such as a cementitious structure, a polymeric structure, a metal structure, an earthen structure, or any combination thereof. In an embodiment, the sensing textile may or may not provide reinforcing properties to the structure. In an embodiment, the sensing textile has an open mesh structure. Advantageously, the open mesh structure provides openings through which an adhesive may flow through to provide desirable adhesion to the structure.

From a public safety perspective, the sensing textile as described herein can be used to indicate damage to an area after a natural disaster or an explosion, to indicate failure of a structure, to indicate soil movement around a structure, or any application where a change in the environment is undesired and would benefit from being monitored and measured.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the items as listed below.

Embodiment 1. A sensing textile including at least one assembly of optical fiber filaments, wherein the sensing textile has a main direction and a cross direction, and wherein the at least one assembly of optical fiber filaments is oriented at any angle measured relative to the cross direction.

Embodiment 2. The sensing textile of embodiment 1, wherein the at least one assembly of optical fiber filaments includes a single-mode optical fiber, a multi-mode optical fiber, or combination thereof.

Embodiment 3. The sensing textile of any of the preceding embodiments, wherein the at least one assembly of optical fiber filaments is in communication with an interrogator.

Embodiment 4. The sensing textile of embodiment 3, wherein the interrogator includes an optical time domain reflectometer (OTDR), an optical time domain analysis (OTDA), an Brillouin optical time domain reflectometer (BOTDR), an Brillouin optical time domain analysis (BOTDA), a Fiber Bragg Grating (FBG), any other interrogator technology, or combination thereof.

Embodiment 5. The sensing textile of any of the preceding embodiments, wherein the at least one assembly of optical fiber filaments includes a plurality of filaments that are generally parallel to each other.

Embodiment 6. The sensing textile of embodiment 5, wherein the plurality of filaments are spaced evenly or spaced randomly as determined by a desired measurement resolution.

Embodiment 7. The sensing textile of any of the preceding embodiments, wherein the at least one assembly of optical fiber filaments extend generally parallel to a main direction of the sensing textile, wherein the main direction is 90° relative to the cross direction.

Embodiment 8. The sensing textile of embodiment 7, wherein the at least one assembly of optical fiber filaments extend along the entire length of the sensing textile.

Embodiment 9. The sensing textile of any of the preceding embodiments, further including a second assembly of filaments, wherein the second assembly of filaments includes a plurality of filaments that are generally parallel to each other and cross over the at least one assembly of optical fiber filaments at a crossing angle.

Embodiment 10. The sensing textile of embodiment 9, wherein the at least one assembly of optical fiber filaments and the second assembly of filaments are knit, woven, laid, or combination thereof.

Embodiment 11. The sensing textile of embodiment 10, wherein the second assembly of filaments includes fiber filaments of an organic material, an inorganic material, or combination thereof.

Embodiment 12. The sensing textile of embodiment 11, wherein the second assembly of filaments includes an optical fiber filament, a non-optical fiber filament, or combination thereof.

Embodiment 13. The sensing textile of embodiment 9, wherein the sensing textile includes a coating to provide a bond between the at least one assembly of optical fiber filaments and the second assembly of filaments.

Embodiment 14. The sensing textile of embodiment 13, wherein the coating between the at least one assembly of optical fiber filaments and the second assembly of filaments includes a thermosetting adhesive binder, a thermoplastic adhesive binder, or any combination thereof.

Embodiment 15. The sensing textile of any of the preceding embodiments, wherein the at least one assembly of optical fiber filaments includes a monofilament or a multifilament.

Embodiment 16. The sensing textile of any of the preceding embodiments, wherein the at least one assembly of optical fiber filaments includes a glass fiber, a polymer fiber, or a blend thereof.

Embodiment 17. The sensing textile of embodiment 16, wherein the at least one assembly of optical fiber filaments include the blend of the glass fiber and the polymer fiber, wherein the glass fiber is a first sensor and the polymer fiber is a second sensor, wherein the first sensor measures a first environmental change and the second sensor measures a second environmental change, wherein the first environmental change is different than the second environmental change.

Embodiment 18. The sensing textile of any of the preceding embodiments, further including a first carrier.

Embodiment 19. The sensing textile of any of the preceding embodiments, wherein the first carrier includes a fabric, a film, or combination thereof.

Embodiment 20. The sensing textile of embodiment 19, wherein the fabric is woven, non-woven, laminated, knit, or combination thereof.

Embodiment 21. The sensing textile of embodiment 20, wherein the fabric includes a non-woven, laid scrim.

Embodiment 22. The sensing textile of embodiment 21, wherein the non-woven, laid scrim includes a 0/90 scrim, and wherein the 0/90 scrim includes: a first set of yarns extending generally parallel to the main direction; and a second set of yarns extending generally parallel to the cross direction and generally perpendicular to the main direction.

Embodiment 23. The sensing textile of embodiment 22, wherein the first set of yarns, the second set of yarns, or combination thereof includes polyester, aramid, or combinations thereof.

Embodiment 24. The sensing textile of embodiment 19, wherein the film includes a thermoset polymer, a thermoplastic polymer, or combination thereof.

Embodiment 25. The sensing textile of any of the preceding embodiments, wherein the first carrier includes a coating to provide a bond between the first carrier and the at least one assembly of optical fiber filaments.

Embodiment 26. The sensing textile of embodiment 25, wherein the coating between the first carrier and the at least one assembly of optical fiber filaments includes a thermosetting adhesive binder, a thermoplastic adhesive binder, or any combination thereof.

Embodiment 27. The sensing textile of any of the preceding embodiments, further including a second carrier overlying the at least one assembly of optical fiber filaments.

Embodiment 28. The sensing textile of any of the preceding embodiments, wherein the at least one assembly of optical fibers measures strain, temperature, humidity, gas, radiation, stress, or combination thereof.

Embodiment 29. The sensing textile of embodiment 28, wherein the measure of strain includes elongation, bending, vibration, or combination thereof.

Embodiment 30. The sensing textile of any of the preceding embodiments, wherein the sensing textile is adjacent to a natural structure, a man-made structure, or combination thereof.

Embodiment 31. The sensing textile of any of the preceding embodiments, wherein the sensing textile is substantially integrated with an earthen structure, a civil structure, a composite structure, or any combination thereof.

Embodiment 32. The sensing textile of embodiment 30, wherein the sensing textile further includes an adhesive layer on a surface that is directly in contact with the natural structure, the man-made structure, or combination thereof.

Embodiment 33. A sensing textile including: a carrier including a fabric, a film, or combination thereof; and at least one assembly of optical fiber filaments overlying the carrier, the at least one assembly of optical fiber filaments including a plurality of optical fiber filaments that are generally parallel to each other, wherein the sensing textile has a main direction and a cross direction, and wherein the at least one assembly of optical fiber filaments is oriented in the main direction of the sensing textile.

Embodiment 34. A sensing textile including: at least one assembly of optical fiber filaments including a plurality of optical fiber filaments that are generally parallel to each other, wherein the sensing textile has a main direction and a cross direction, and wherein the at least one assembly of optical fiber filaments is oriented in the main direction of the sensing textile; and a second assembly of filaments, wherein the second assembly of filaments includes a plurality of filaments that are generally parallel to each other and cross over the at least one assembly of optical fiber filaments at a crossing angle.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A sensing textile comprising:
at least one assembly of optical fiber filaments, wherein the sensing textile has a main direction and a cross direction, and wherein the at least one assembly of optical fiber filaments is oriented at any angle measured relative to the cross direction, wherein the at least one assembly of optical fiber filaments measures a change in a value along a length of the optical fiber filament and along a cross-section, a surface, or combination thereof of a structure adjacent to the sensing textile, the change in the value corresponding to an environmental change comprising strain, temperature, or combination thereof along the cross-section, the surface, or combination thereof of the structure, wherein the sensing textile is a flexible fabric having a width of at least 0.25 meters.

2. The sensing textile of claim 1, wherein the at least one assembly of optical fiber filaments comprises a single-mode optical fiber, a multi-mode optical fiber, or combination thereof.

3. The sensing textile of claim 1, wherein the at least one assembly of optical fiber filaments is in communication with an interrogator.

4. The sensing textile of claim 1, wherein the at least one assembly of optical fiber filaments comprises a plurality of filaments that are generally parallel to each other.

5. The sensing textile of claim 1, wherein the at least one assembly of optical fiber filaments extend generally parallel to a main direction of the sensing textile, wherein the main direction is 90° relative to the cross direction.

6. The sensing textile of claim 1, further comprising a second assembly of filaments, wherein the second assembly of filaments comprises a plurality of filaments that are generally parallel to each other and cross over the at least one assembly of optical fiber filaments at a crossing angle.

7. The sensing textile of claim 6, wherein the at least one assembly of optical fiber filaments and the second assembly of filaments are knit, woven, laid, or combination thereof.

8. The sensing textile of claim 7, wherein the second assembly of filaments comprises fiber filaments of an organic material, an inorganic material, or combination thereof.

9. The sensing textile of claim 7, wherein the second assembly of filaments comprises an optical fiber filament.

10. The sensing textile of claim 6, wherein the sensing textile comprises a coating to provide a bond between the at least one assembly of optical fiber filaments and the second assembly of filaments.

11. The sensing textile of claim 1, wherein the at least one assembly of optical fiber filaments comprises a monofilament.

12. The sensing textile of claim 1, wherein the at least one assembly of optical fiber filaments comprises a glass fiber, a polymer fiber, or a blend thereof.

13. The sensing textile of claim 12, wherein the at least one assembly of optical fiber filaments comprise the blend of the glass fiber and the polymer fiber, wherein the glass fiber is a first sensor and the polymer fiber is a second sensor, wherein the first sensor measures a first environmental change and the second sensor measures a second environmental change, wherein the first environmental change is different than the second environmental change.

14. The sensing textile of claim 1, further comprising a first carrier.

15. The sensing textile of claim 14, wherein the first carrier comprises a fabric, a film, or combination thereof.

16. The sensing textile of claim 14, wherein the first carrier comprises a coating to provide a bond between the first carrier and the at least one assembly of optical fiber filaments.

17. The sensing textile of claim 1, further comprising a second carrier overlying the at least one assembly of optical fiber filaments.

18. The sensing textile of claim 1, wherein the at least one assembly of optical fibers further measures humidity, gas, radiation, stress, or combination thereof.

19. A sensing textile comprising:
a carrier comprising a fabric, a film, or combination thereof; and
at least one assembly of optical fiber filaments overlying the carrier, the at least one assembly of optical fiber filaments comprising a plurality of optical fiber filaments that are generally parallel to each other, wherein the sensing textile has a main direction and a cross direction, and wherein the at least one assembly of optical fiber filaments is oriented in the main direction of the sensing textile, wherein the at least one assembly of optical fiber filaments measures a change in a value along a length of the optical fiber filament and along a cross-section, a surface, or combination thereof of a structure adjacent to the sensing textile, the change in the value corresponding to an environmental change comprising strain, temperature, or combination thereof along the cross-section, the surface, or combination thereof of the structure, wherein the sensing textile is a flexible fabric having a width of at least 0.25 meters.

20. A sensing textile comprising:
at least one assembly of optical fiber filaments including a plurality of optical fiber filaments that are generally parallel to each other, wherein the sensing textile has a main direction and a cross direction, and wherein the at least one assembly of optical fiber filaments is oriented in the main direction of the sensing textile, wherein the at least one assembly of optical fiber filaments measures a change in a value along a length of the optical fiber filament and along a cross-section, a surface, or combination thereof of a structure adjacent to the sensing textile, the change in the value corresponding to an environmental change comprising strain, temperature, or combination thereof along the cross-section, the surface, or combination thereof of the structure; and
a second assembly of filaments, wherein the second assembly of filaments comprises a plurality of filaments that are generally parallel to each other and cross over the at least one assembly of optical fiber filaments at a crossing angle, wherein the sensing textile is a flexible fabric having a width of at least 0.25 meters.

* * * * *